United States Patent
Mu et al.

(10) Patent No.: US 9,746,057 B2
(45) Date of Patent: Aug. 29, 2017

(54) DRIVE MECHANISM FOR OPTO-MECHANICAL INSPECTION SYSTEM

(71) Applicant: DONGFANG JINGYUAN ELECTRON LIMITED, Beijing (CN)

(72) Inventors: Yuhai Mu, Fremont, CA (US); Zongqiang Yu, San Jose, CA (US)

(73) Assignee: Dongfang Jingyuan Electron Limited, Beijing (CN)

( * ) Notice: Subject to any disclaimer, the term of this patent is extended or adjusted under 35 U.S.C. 154(b) by 143 days.

(21) Appl. No.: 14/730,136

(22) Filed: Jun. 3, 2015

(65) Prior Publication Data
US 2016/0327138 A1 Nov. 10, 2016

(30) Foreign Application Priority Data
May 7, 2015 (CN) .......................... 2015 1 0230182

(51) Int. Cl.
| | |
|---|---|
| F16H 19/06 | (2006.01) |
| F16H 37/00 | (2006.01) |
| F16H 19/00 | (2006.01) |
| G02F 1/1335 | (2006.01) |

(52) U.S. Cl.
CPC ..... *F16H 19/005* (2013.01); *G02F 1/133528* (2013.01)

(58) Field of Classification Search
CPC .. F16H 19/08; F16H 2019/085; F16H 19/005; B25J 9/104; B25J 9/1045; G02F 1/133528
See application file for complete search history.

(56) References Cited

U.S. PATENT DOCUMENTS

| | | | | |
|---|---|---|---|---|
| 2,588,642 | A * | 3/1952 | Malsbary | F16H 19/005 74/98 |
| 4,507,104 | A * | 3/1985 | Clark | F16H 19/0672 474/112 |
| 4,537,084 | A * | 8/1985 | Passemard | B25J 9/023 267/71 |
| 5,778,730 | A * | 7/1998 | Solomon | B25J 9/1045 403/387 |
| 6,634,851 | B1 * | 10/2003 | Bonora | B25J 9/042 414/744.3 |
| 2005/0050977 | A1 * | 3/2005 | Kent | B25J 9/107 74/490.06 |
| 2006/0258497 | A1 * | 11/2006 | Dec | F16H 7/1218 474/112 |
| 2007/0089557 | A1 * | 4/2007 | Solomon | B25J 9/1045 74/490.01 |

(Continued)

*Primary Examiner* — Jake Cook
(74) *Attorney, Agent, or Firm* — Joe Zheng

(57) ABSTRACT

A drive mechanism to move an optical component sensitive to particles is described. The drive mechanism has high precision in rotation, great reliability and durability life, no backlash, and far less particle contamination. The drive mechanism can be advantageously used in high precision rotation driving processes for opto-mechanical inspection systems that require high movement precision and no-contamination. In one embodiment, two pulleys are used with their axes to be parallel from each other, two bands are used to rotate the pulleys in opposite directions. An eccentric disk mechanism is used to fine-tune the distance between the two pulleys so that tensions on the two bands can be optimized.

14 Claims, 14 Drawing Sheets

(56) References Cited

U.S. PATENT DOCUMENTS

| | | | |
|---|---|---|---|
| 2009/0186727 A1* | 7/2009 | Serkh | F16H 7/1236 474/112 |
| 2011/0214524 A1* | 9/2011 | Jacobsen | A61F 2/68 74/490.04 |
| 2012/0199051 A1* | 8/2012 | Edinger | A47B 5/006 108/139 |

* cited by examiner

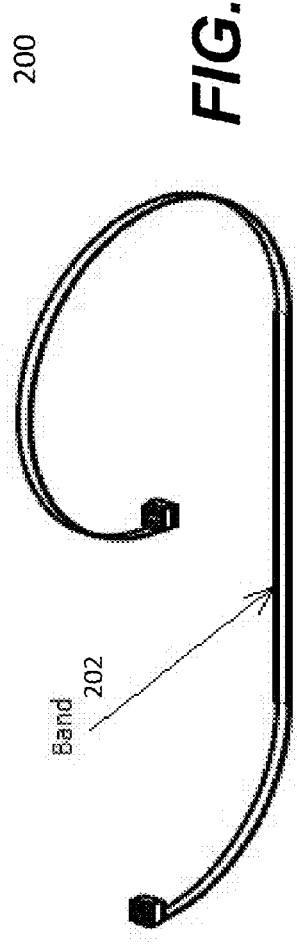
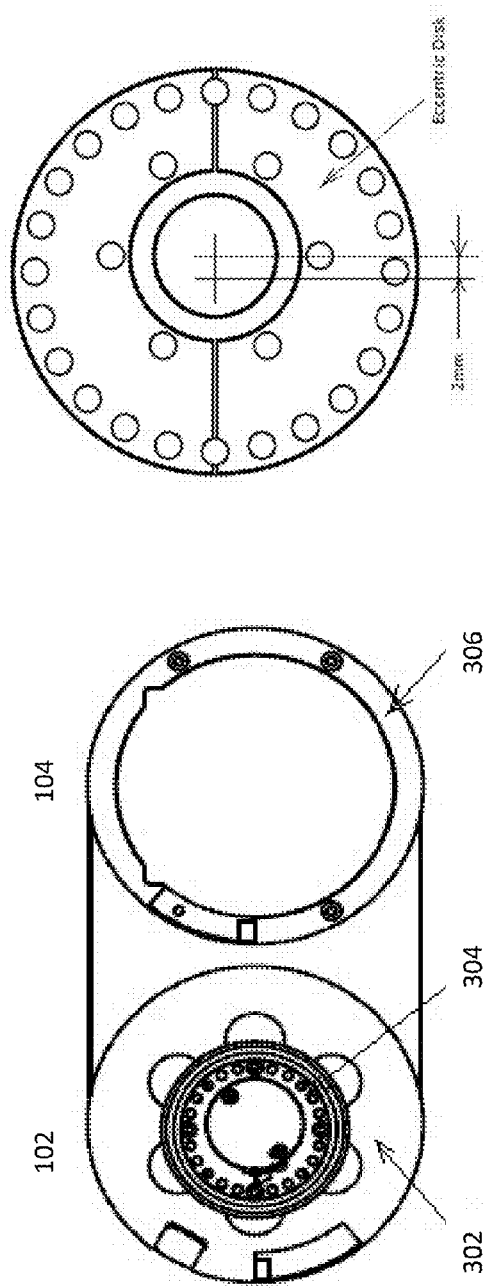
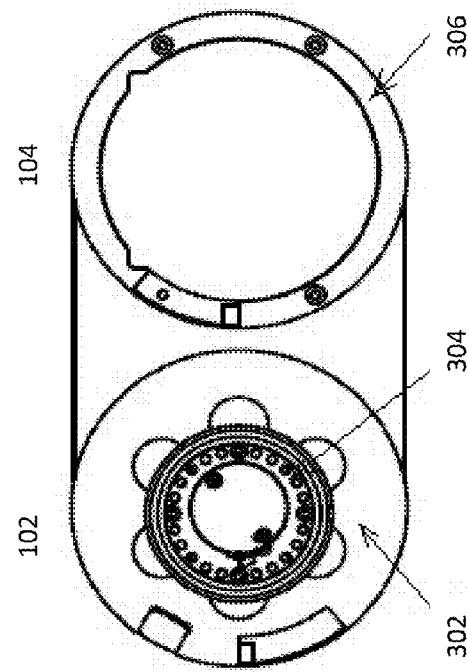

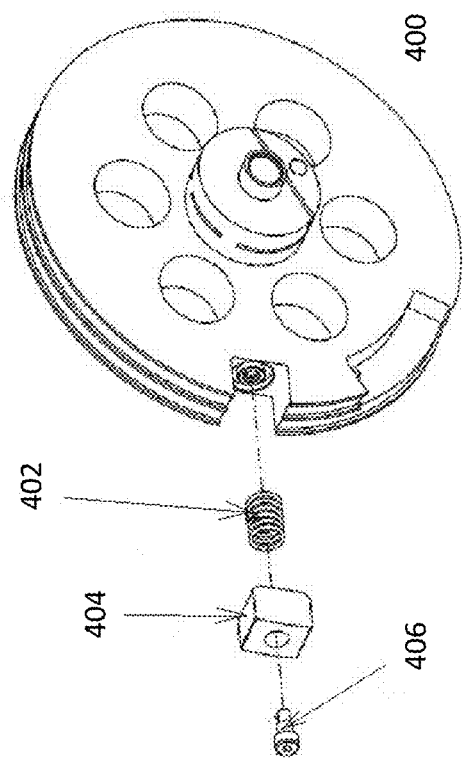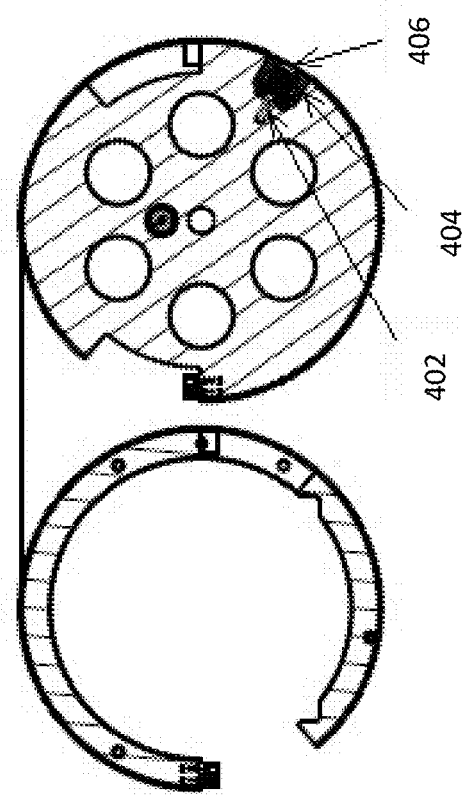
FIG. 4A
FIG. 4B

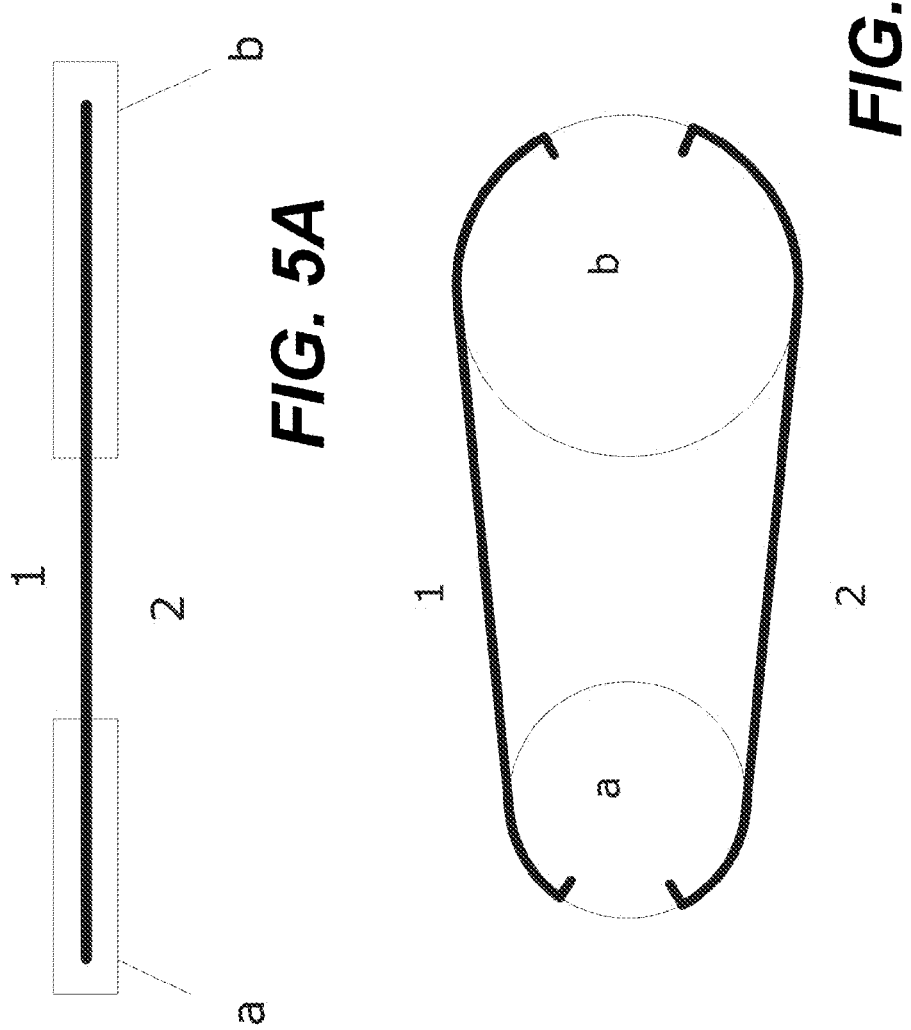

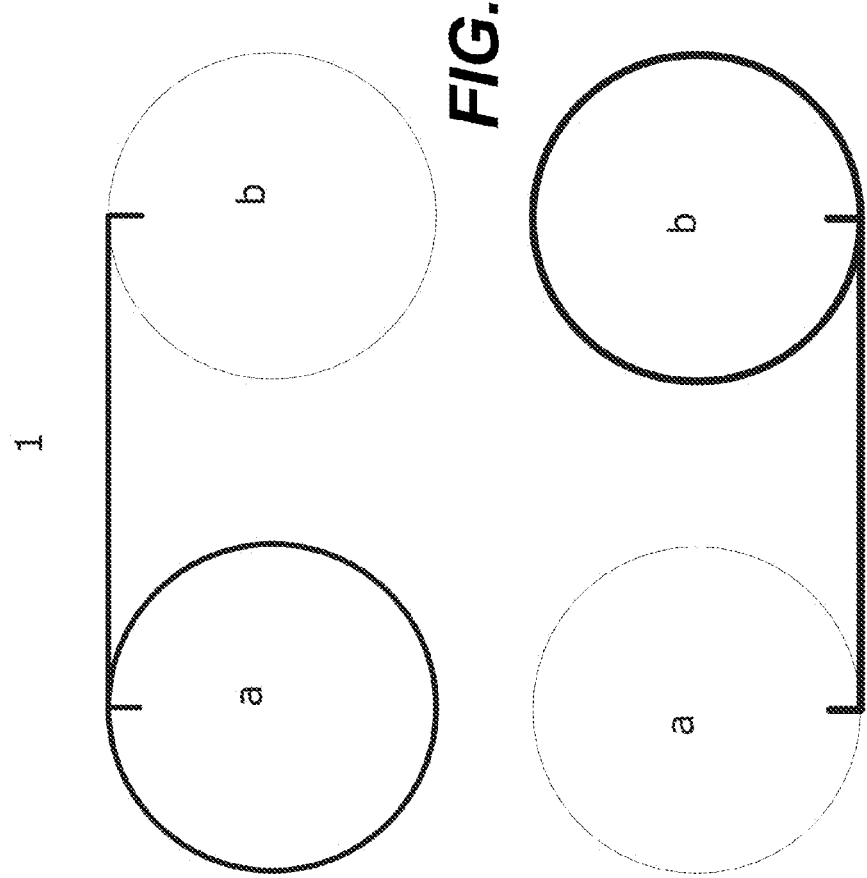

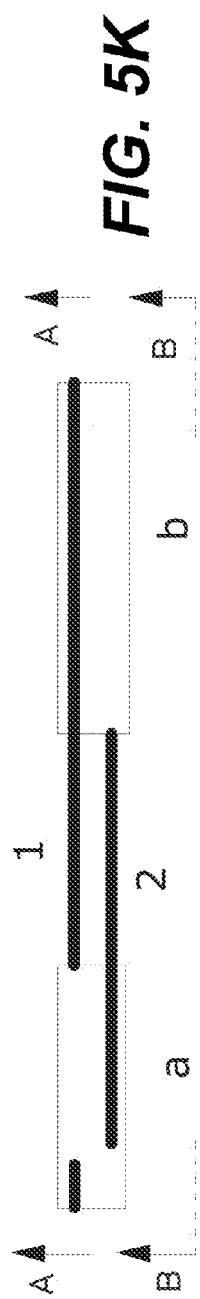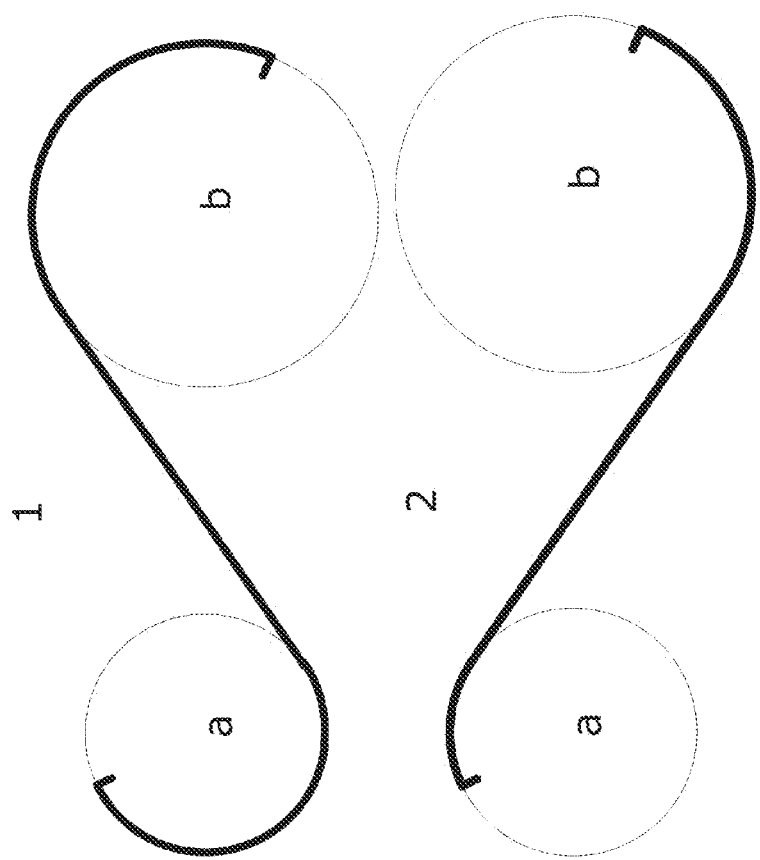
FIG. 5K
FIG. 5L
FIG. 5M

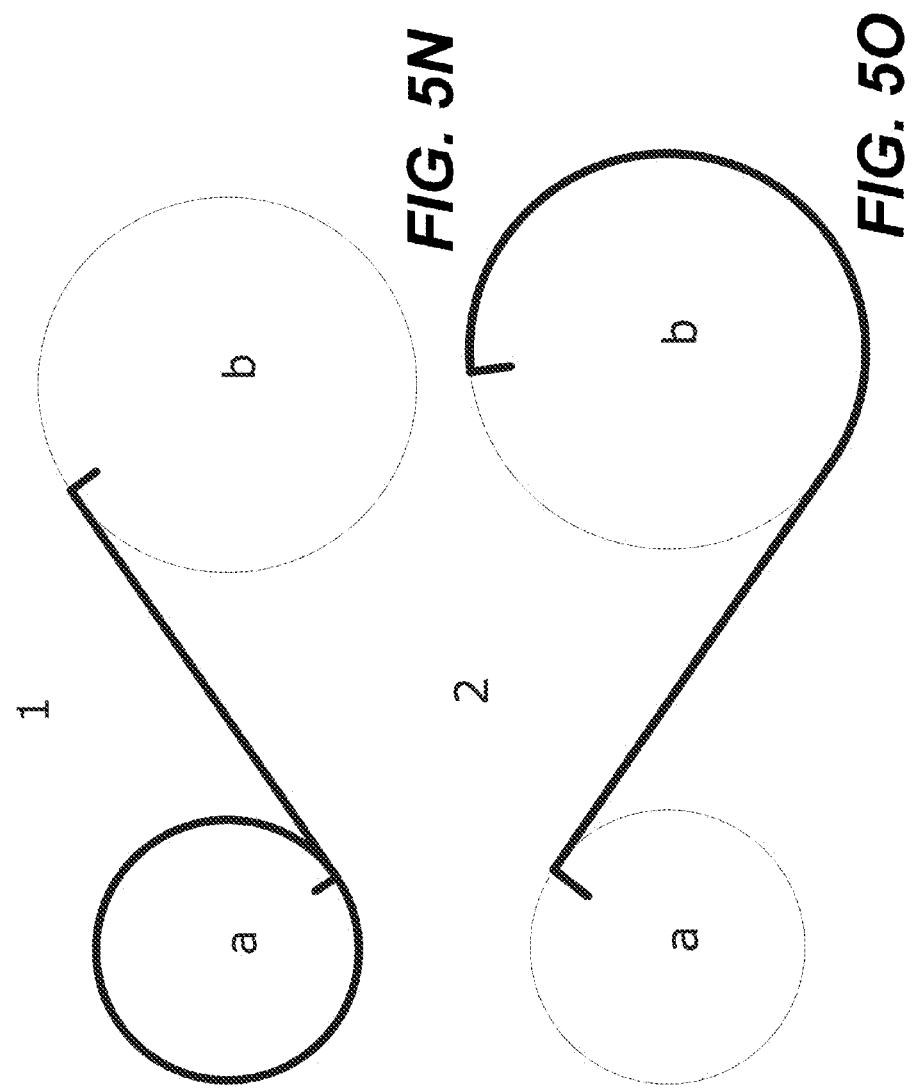

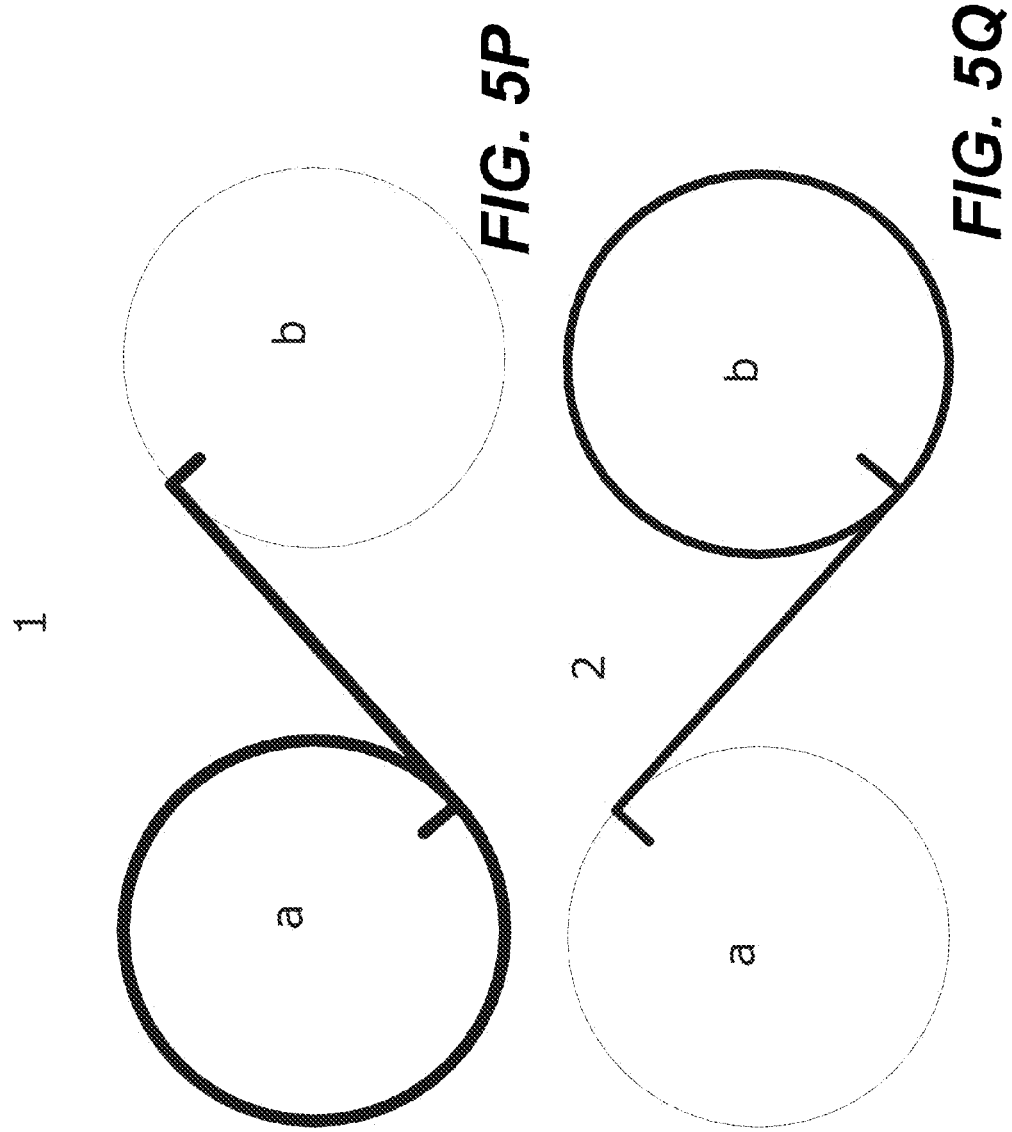

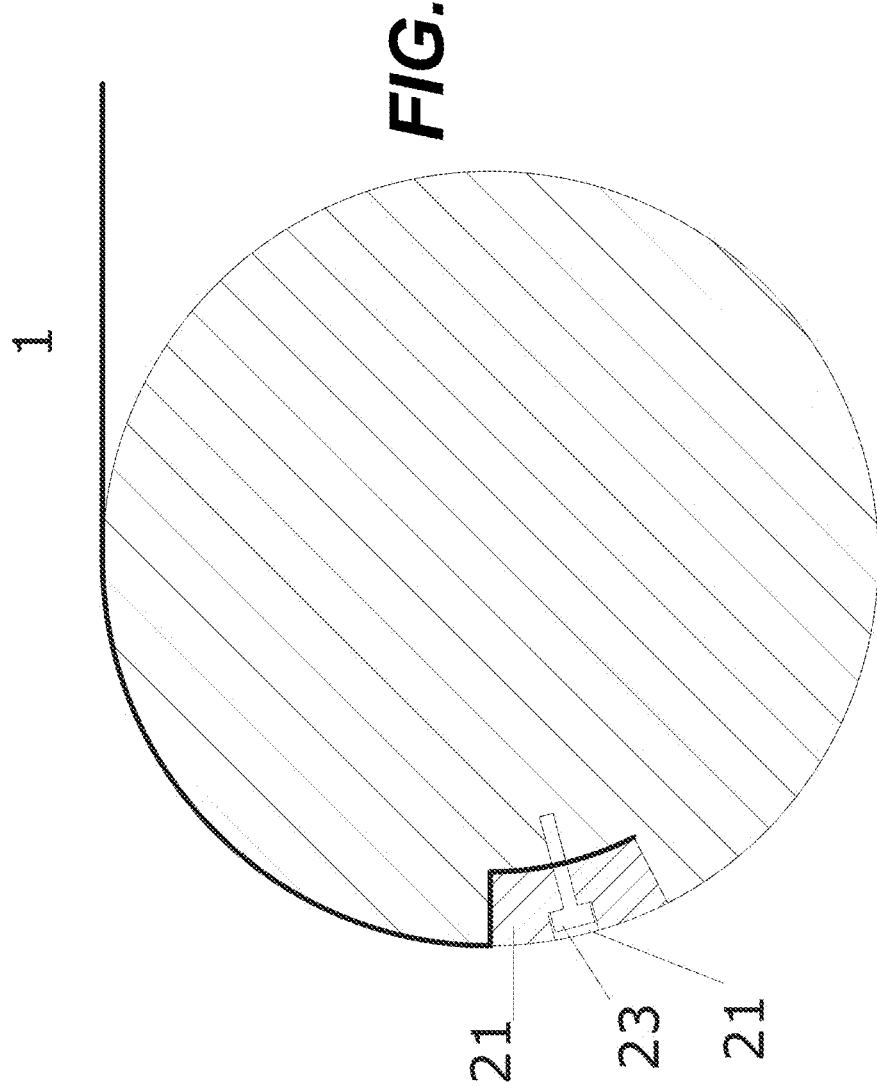

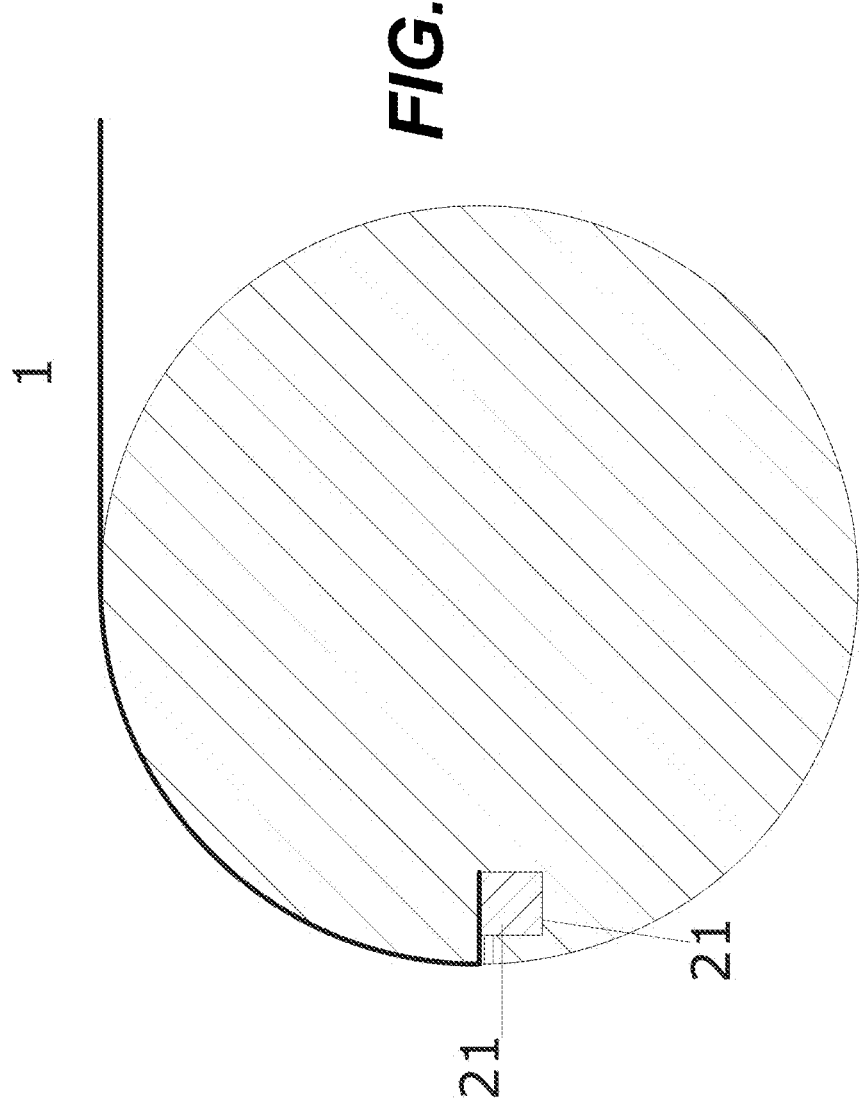

DRIVE MECHANISM FOR OPTO-MECHANICAL INSPECTION SYSTEM

BACKGROUND OF THE INVENTION

Field of the Invention

The present invention is related to the area of opto-mechanical inspection system, and more particularly related to a band drive mechanism for opto-mechanical system that has high precision in rotation, great reliability and durability, no backlash, and no particle contamination.

Description of the Related Art

In opto-mechanical inspection system designs, there is always a requirement or movement to rotate an optical part or component, for example, for measurement or inspection. An exemplary optical component is an optical polarizer, an optical aperture wheel, an optical filter assembly, and an optical compensator. To get an ideal optical inspection resolution, it is very critical to perform the rotation with very high precision (minimum backlash or no backlash at all). Further, the drive mechanism shall be of great reliability and durability. For the optical components under laser beams, if a rotation driving mechanism creates some particles in its movement process, the particles would fill in the gaps of the movement driving pair, such as gear pair or cam pair, causing dimension errors onto the rotation components. As a result, the transmission accuracy is affected. If the driving mechanism needs lubricant to be applied onto the driving parts, it would create contamination on the surface of the optical component, then causing defects to the optical component being moved. Currently, most typical optical component rotation driving mechanisms are using gear-pair, chain drive, cable drive, or cam-pair. These types of driving methods have the typical dis-advantages or issues mentioned above when used in the OPTO-mechanical inspection system. Hence there is a need for an optical component driving mechanism to be free of any contamination, both particles and lubricant.

In a traditional rotation driving mechanism, gear-pair driving is widely used. Due to its mechanical nature of the driving principle, there is tooth-tooth meshing error due to the dimension tolerance of the gears. The backlash between the gear-pair shall happen even using anti-backlash gears, which could affect the rotation accuracy commonly required in an opto-mechanical inspection system. Further, due to the friction between the meshing surfaces of the gear-pair, particles are often generated when rotation happens. The particles become another source of the dimension errors of the gear surface. To decrease the friction between the surfaces of gears, oil or other lubricant are often applied in the gear-pair. The applied lubricant is a contamination source to damage the cleanness of the optical component surface. Besides these issues, the friction on the gear surface causes wears to the gears, which affects the life of the gear-pair. On considering the above-mentioned issues or drawbacks, the gear-pair is not an idea rotation driving mechanism for the opto-mechanical inspection system. Similarly, the worm driving mechanism is a special gear driving one and has the similar issues as the gear-pair does.

Timing-belt/pulley, chain/sprocket are other methods often used to drive rotation movements. The timing-belt and pulley drive, although having a relatively low backlash, generate particles in its driving process. These particles will contaminate the environment of the rotation mechanism. These particles can also be dropped onto the surface of an optical component in an opto-mechanical inspection system. Most of the traditional timing belt material is also not suitable for the opto-mechanical inspection system which is always under the exposure of laser beam, and even Ultra-Violet (UV) light or deep Ultra-Violet (DUV) light. On the other hand, due to the structure of the chain/sprocket drive, the sprocket and the chain are not so tightly controlled with their dimensions, the tension of the chain will change after running for a certain period. These characteristics make it very easy to have a big backlash, and the particle issue is another big concern. Accordingly, the chain/sprocket driving mechanism is not suitable for the opto-mechanical inspection system.

Cam driving is a typical friction driving mechanism, it can transform a linear movement into rotation. It relies on the friction between the cam and the cam follower to pass a driving movement. This process generates particles easily. There is often a need to lubricate the cam follower, which can be a source to contaminate the surface of the optical component. Some band driving mechanism such as Timothy David Puckett's band driving mechanism used in telescope rotation system relies on the friction between the band and the pulley, which has the particles issue as well. The rotation driving mechanisms are not suitable in an opto-mechanical inspection system.

Cable rotation drive has been found in many applications. In general, it has low or no contamination, and is relatively low or of no backlash if the cable material is of high quality. The cost of the special required cable material is of a concern in some driving applications.

In this disclosure, a novel band drive rotation mechanism is described. One of the advantages, objectives and benefits of the band drive rotation mechanism is of high precision in rotation, great reliability and durability, and has no backlash and no particle contamination.

SUMMARY OF THE INVENTION

This section is for the purpose of summarizing some aspects of the present invention and to briefly introduce some preferred embodiments. Simplifications or omissions may be made to avoid obscuring the purpose of the section. Such simplifications or omissions are not intended to limit the scope of the present invention.

In general, the present invention is related to a moving mechanism particularly suitable for an opto-mechanical inspection system. According to one aspect of the present invention, a band drive rotation mechanism includes two pulleys, a driving one and a driven one, of the same size or similar size. The driving pulley is motorized by a motor and drives the driving one via one or more bands. It provides rotations from 0° to 360°. Due to its special driving mechanism, there is no relative movement between a band and a pulley so to minimize possible friction between the band and pulley. With a proper material selected for the bands and the pulleys, there are no contamination particles produced in the rotation process, the surface of optical components being moved can be free of contamination all the time.

According to another aspect of the present invention, the wear and tear is minimized on either the band or the pulley. As a result, this driving mechanism enjoys an advantage of substantial operating life. It is an ideal driving mechanism for an opto-mechanical inspection system that requires only less than 1 full rotation.

Other objects, features, benefits and advantages, together with the foregoing, are attained in the exercise of the invention in the following description and resulting in the embodiment illustrated in the accompanying drawings.

BRIEF DESCRIPTION OF THE DRAWINGS

These and other features, aspects, and advantages of the present invention will become better understood with regard to the following description, appended claims, and accompanying drawings where:

FIG. 2 shows an exemplary band structure according to one embodiment of the present invention;

FIG. 3A shows a front view of two pulleys;

FIG. 3B shows an enlarged view of an eccentric disk with a specified off-center parameter according to one embodiment of the present invention;

FIG. 4A shows a perspective view of a driving disk with a notch made to accommodate a spring and a holding block;

FIG. 4B shows a spring loaded pushing force generating mechanism in operation;

FIG. 5A and FIG. 5B, both show a top view and a front view of two pulleys in two different sizes;

FIG. 5I and FIG. 5J show that one example of mounting a band when the lengths of the top-side band and the down-side band are identical;

FIG. 5K shows a different configuration of mounting the top-side band and the down-side bands, which as a result changes the rotational direction of the driven pulley;

FIG. 5L and FIG. 5M each show a corresponding front view;

FIG. 5N-FIG. 5Q shows additional possible mountings of the top-side band and the down-side bands on a disk in each of the pulleys, and FIG. 6A-FIG. 6C, each showing an example of how to attach an end of a band to the disk.

DETAILED DESCRIPTION OF THE PREFERRED EMBODIMENTS

The detailed description of the present invention is presented largely in terms of procedures, steps, logic blocks, processing, or other symbolic representations that directly or indirectly resemble the operations of mechanical devices. These descriptions and representations are typically used by those skilled in the art to most effectively convey the substance of their work to others skilled in the art. Numerous specific details are set forth in order to provide a thorough understanding of the present invention. However, it will become obvious to those skilled in the art that the present invention may be practiced without these specific details. In other instances, well known methods, procedures, components, and circuitry have not been described in detail to avoid unnecessarily obscuring aspects of the present invention.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments.

Embodiments of the present invention are discussed herein with reference to FIGS. 1-6C. However, those skilled in the art will readily appreciate that the detailed description given herein with respect to these figures is for explanatory purposes as the invention extends beyond these limited embodiments.

Figure 1:
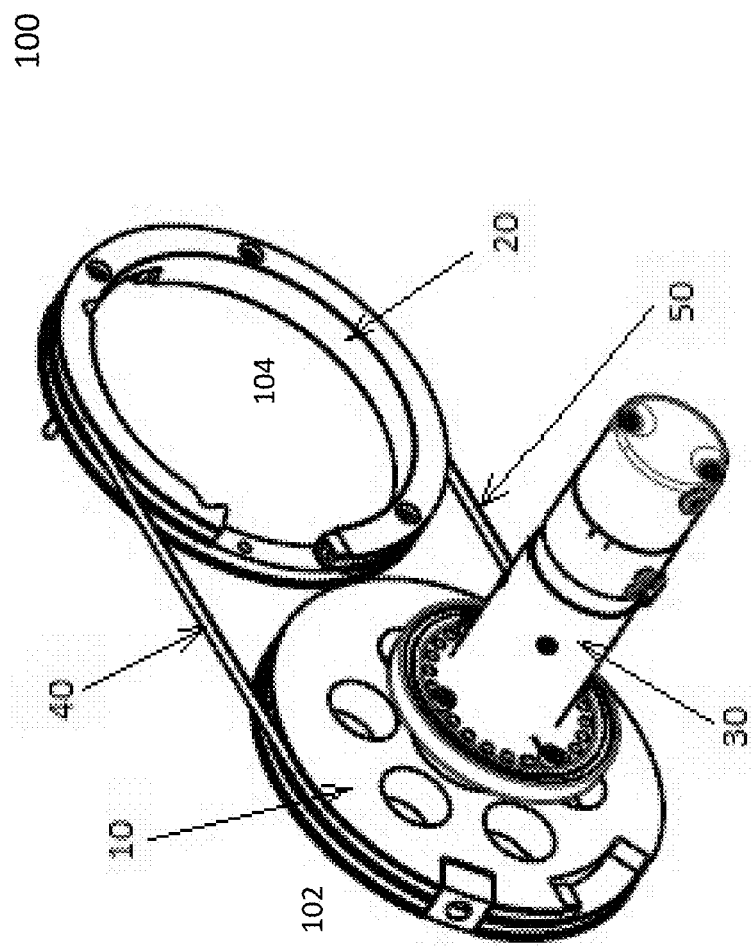
FIG. 1 shows an exemplary rotation driving mechanism 100 according to one embodiment of the present invention.

The present invention pertains to a band drive mechanism that can be advantageously used in an opto-mechanical inspection system. FIG. 1 shows an exemplary rotation driving mechanism 100 according to one embodiment of the present invention. From a perspective view of the drive system 100, there are two pulleys a and b referenced, respectively, referenced by 102 and 104. The pulleys 102 and 104 may be identical or different in diameters. In one embodiment, the pulley 102 is the driving pulley and includes a disk driven by a motor 30 to provide the driving torque to the moving mechanism 100. It gives a transmission gear ratio of about 1:1. The pulley 104 includes a ring 20 and is driven by the pulley 102 via a band belt or an up-side band 40 as there is a down-side band 50. Depending on implementation, more than one of the up-side or down-side band may be used in parallel. When employed in an opto-mechanical inspection system, an optical component (not shown) is mounted onto the driven pulley 104 and rotates the driven pulley 104 is driven by the driving pulley 102. In operation, when the motor drives the driving pulley 102 to rotate anti-clockwise, through the top-band 40, a pulling force is translated through the top band 40 and drives the driven pulley 104, and causes the optical component to rotate to a predefined angle up to 360°.

The down-side band 50 is a follower that balances the rotations of the pulleys 102 and 104. When the driving pulley 102 rotates anti-clockwise, the up-side band 50 provides a pulling force to rotate the driven pulley 104 and the down-side band 50 acts as follower. When the driving pulley 102 rotates clockwise, the down-side band 50 provides a pulling force to rotate the driven pulley 104, the top-side band 40 acts as a follower.

Since the rotation movement is generated by the pulling force through the band 40 or 50, there is no friction between the band 40 or 50 and the pulley 104. With carefully selected material for the band 40 or 50, there are no particles falling from the band in the rotation process, thus no contamination from the particles would occur. Again with carefully selected materials the pulleys 102 and 104 as well as for the band 40 or 50, the wear and tear can be minimized on both the bands and the pulleys. In one embodiment, the material selected for the pulleys is aluminum, which is of low cost and in general easy to make. As described above, no contamination would happen from the bands, when used in the opto-mechanical system, the surface of the optical component can be kept clean. As a result of the invention, an optical system employing one embodiment of the present invention is guaranteed to provide a moving mechanism for a very long term.

FIG. 2 shows an exemplary band structure according to one embodiment of the present invention. The band material is preferably a kind of high strength and produces no particles so as not to contaminate any parts that are being driven by the pulleys using the band. One exemplary band material is Elgiloy that is a cobalt chromium nickel with the composition of: CO 40%, CR20%, NI 15% Mo7%, MN2% etc. After its heat treatment process, this material processing produces thin bands with very high strength. There is no-contamination being generated by this material. It has an excellent fatigue resistance, thus a substantial operating life of the bands is achievable. Besides elgiloy, stainless steel is also a very good choice for this kind band drive applications. Depending on application, a selection of the bend radius, band thickness and band width may be made according to the stress calculation of the band mechanism.

To get an optimized band tension for this rotation driving mechanism, the eccentric disk 10 on which the motor is mounted is uniquely designed. FIG. 3A shows a front view of the pulleys 102 and 104. As shown in FIG. 3A, the disk 302 has a round opening to accommodate a shaft of a motor. The center of the round opening is off the center of the disk 302, hence the disk 302 is also referred to as an eccentric disk. FIG. 3B shows an enlarged view of an eccentric disk with a specified off-center parameter according to one embodiment of the present invention.

In between the eccentric disk 10 and the driving pulley 20, there is a ball bearing to make the adjustment of a certain orientation (i.e., a required angle for the eccentric disk) easier. At the beginning of assembling the eccentric disk 302, an alignment line is in the horizontal direction, the smaller radius direction is facing to the driven pulley 104. At this orientation, the distance between the two pulleys 102 and 104 is the smallest. When the eccentric disk is rotated to a certain angle, for example, one step can be 360°/24=15°, there are totally 24 hole locations, which means the eccentric disk can be rotated from 15° to 360°, so the distance between the two pulleys can be increased from 0 mm to 2 mm while the distance adjustment step is 0.083 mm. When the band tension is optimized, the eccentric disk 302 can be locked to that orientation by a fastening means (e.g., screws).

To have an even fine band tension adjustment, a fine band tension adjustment mechanism is built on the driving pulley. In one embodiment, a spring loaded pushing force generating mechanism is provided. FIG. 4A shows a perspective view of a disk 400. A notch is made on the disk 400 to accommodate a spring 402 and a holding block 404. The spring 402 is stiff enough but compressed and held up by the spring holding block 404. A shoulder screw 406 is used to hold the block 404 and the spring 402 on the right position, in the notch of the driving pulley. In operation, the holding block 404 is pushed by the compressed spring 402 to move outwards in the direction of the radius of the pulley. The direction of this movement is guided by the shoulder screw 406. When two bands (not shown in FIG. 4A) are used, both are lying outside of this spring holding block 404, so the movement of the block 404 is pushing inwards, resulting in both bands to be tighter as shown in FIG. 4B. By selecting different spring with different stiffness, the pushing force provided by the spring 402 can be fine-tuned. The final band tension is optimized to an even finer degree when this fine-tune mechanism is employed.

It is very critical to have no backlash in such high precision movement process, such as the opto-mechanical inspection system. Using the above mentioned two band tension adjustment methods, the band tensions can be optimized, so there is no-backlash in this driving mechanism.

According to one embodiment of using two bands on one side, as shown in FIG. 4A, two groves (e.g., flat) are machined on the outer surfaces of the two pulleys. According, three ridges are formed on the outer surface of each pulley to confine the two bands respectively. In operation, these two groves work as tracks to keep the bands in track, preventing them from running off the outer surfaces of the pulleys.

Figure 5C:
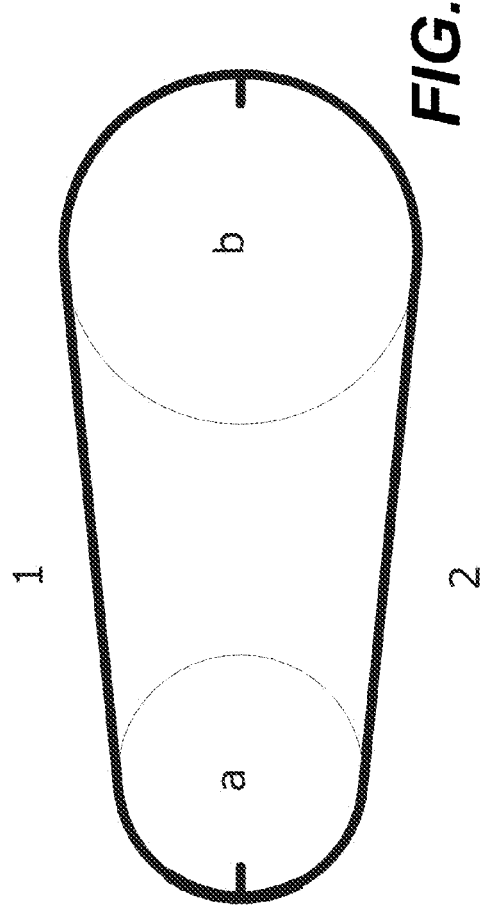
FIG. 5C and FIG. 5D each show both ends of the up-side band and down-side band are fastened together on the outside of a disk.
Figure 5D:
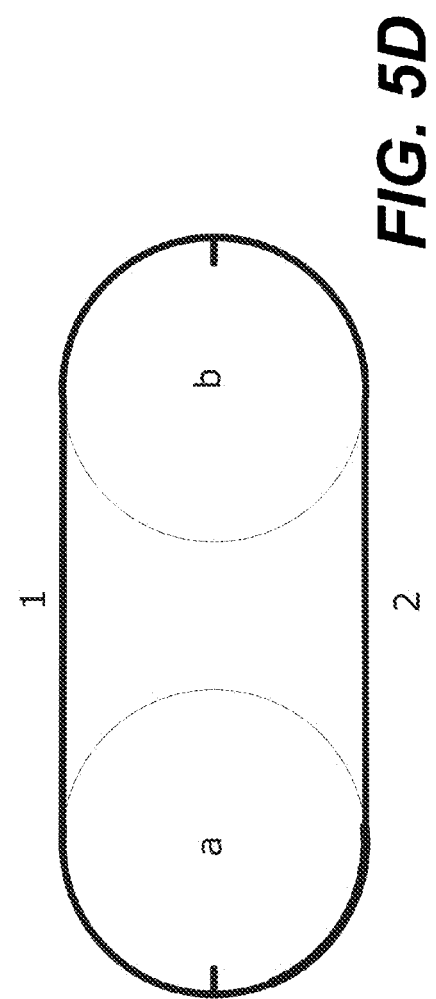

Referring now to FIG. 5A and FIG. 5B, both show a top view and a front view of two pulleys in two different sizes, where both ends of the up-side band and down-side band are separately fastened on the outside of the disk. In an alternative embodiment, FIG. 5C or FIG. 5D shows both ends of the up-side band and down-side band are fastened together on the outside of the disk.

Figure 5E:
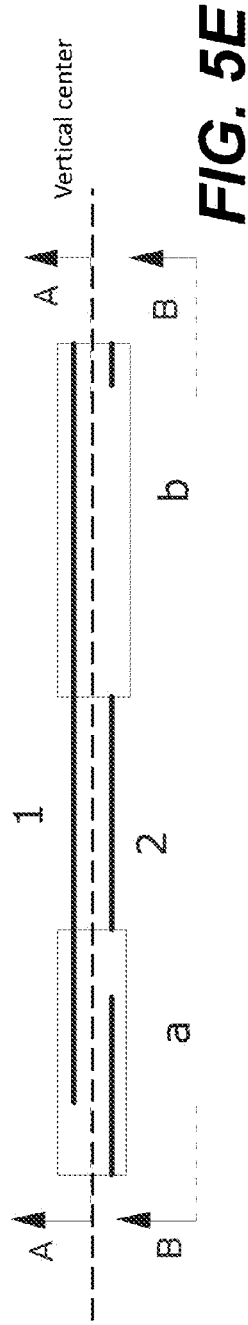
FIG. 5E and FIG. 5F show together the up-side band and the down-side bands are positioned symmetrically about a vertical center of each of the disks in the pulleys.
Figure 5F:
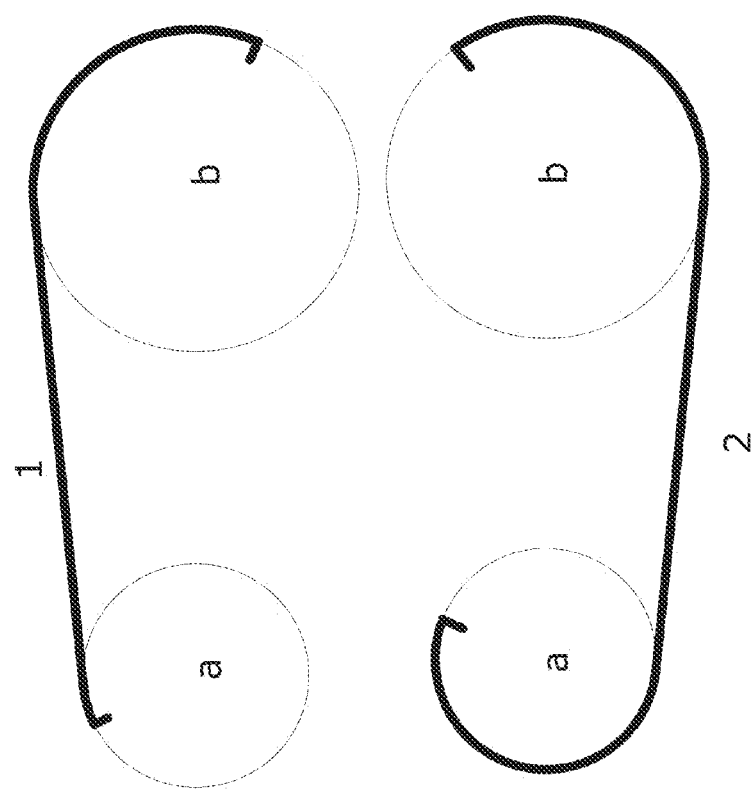

FIG. 5E and FIG. 5F show together the up-side band and the down-side bands are positioned symmetrically about the vertical center of each by the disks in the pulleys. Two respective groves (for the up-side band and the other for the down-side band) are made on the outer surfaces of the two pulleys. Geometrically, these two groves are not on the same plane, but are on two parallel planes with a distance therebetween.

Figure 5G:
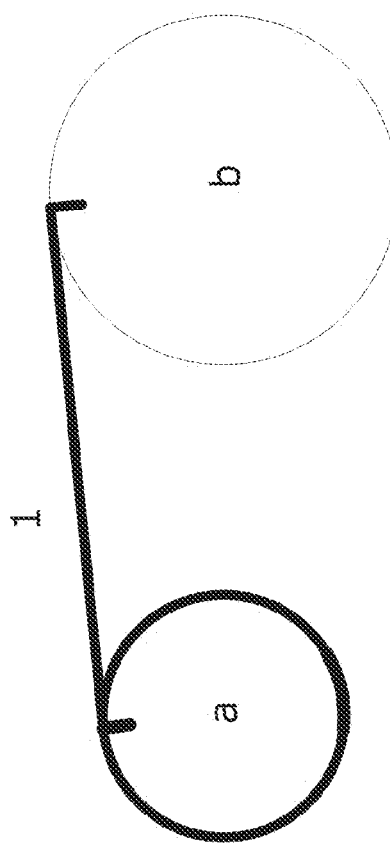
FIG. 5G and FIG. 5H show that the lengths of the top-side band and the down-side band may not be necessarily identical.
Figure 5H:
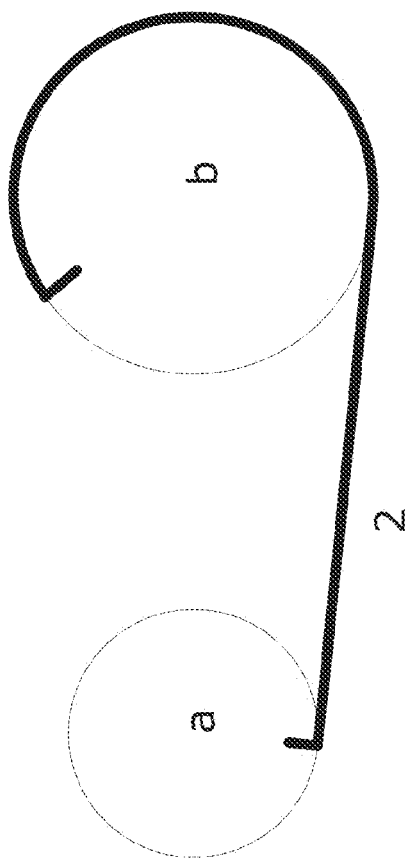

FIG. 5G and FIG. 5H show that the lengths of the top-side band and the down-side band may not be necessarily identical. The two ends of a band may be fixed in a notch made on a disk wherever it is deemed appropriate, resulting in asymmetric locations of the notches for the ends of the top-side band and the down-side band on a disk.

FIG. 5I and FIG. 5J show that one example of mounting a band when the lengths of the top-side band and the down-side band are identical. In the example, one band is to encircle one disk and another band is to encircle another disk.

FIG. 5K shows a different configuration of mounting the top-side band and the down-side bands, which as a result changes the rotational direction of the driven pulley. As an option, FIG. 5K further shows that the top-side band and the down-side bands are driving the driven pulley on two separate planes. FIG. 5L and FIG. 5M show the corresponding front views.

FIG. 5N-FIG. 5Q shows additional possible mountings of the top-side band and the down-side bands on a disk in each of the pulleys.

Figure 6A:
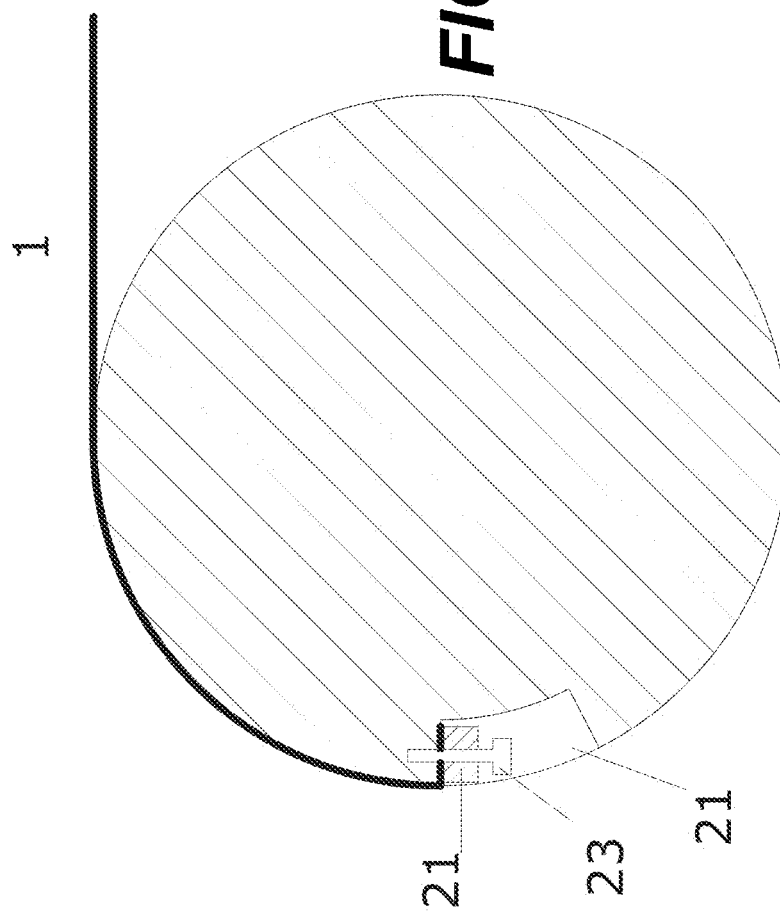

Referring now to FIG. 6A-FIG. 6C, each showing an example of how to attach the ends of the bands to the disk. Essentially, a notch is made on the disk to bend the end of a band and insert the end of the band into the notch, where a fastening means is provided to secure the end of the band to the disk.

The present invention has been described in sufficient details with a certain degree of particularity. It is understood to those skilled in the art that the present disclosure of embodiments has been made by way of examples only and that numerous changes in the arrangement and combination of parts may be resorted without departing from the spirit and scope of the invention as claimed. Accordingly, the scope of the present invention is defined by the appended claims rather than the foregoing description of embodiments.

What is claimed is:

1. A band-drive mechanism in an opto-mechanical inspection system to move an optical component sensitive to particles, the band-drive mechanism comprising:
   a first pulley including a first disk driven by a motor, wherein the first disk includes a spring loaded pushing force generating mechanism including:
   a notch formed on the first disk;
   a spring;
   a spring holding block; and
   a shoulder screw, wherein the spring is compressed and held up by the spring holding block, the shoulder screw is used to hold the spring holding block and the spring in the notch of the first disk;

a second pulley including a second disk;

an up-side band and a down-side band, both made from a solid material that requires no lubricants when in operation, wherein both ends of the up-side band and the down-side band are respectively secured on the first and second disks, and the second pulley is pulled to rotate by one of the up-side and down-side bands when the first pulley is driven by the motor.

2. The band-drive mechanism as recited in claim 1, wherein the material is metal.

3. The band-drive mechanism as recited in claim 2, wherein the metal is elgiloy steel or stainless steel.

4. The band-drive mechanism as recited in claim 1, wherein centers of the first disk and the first pulley are not coaxial.

5. The band-drive mechanism as recited in claim 1, wherein the first disk is an eccentric disk.

6. The band-drive mechanism as recited in claim 1, wherein a band tension on one of the up-side and down-side bands is optimized when stiffness of the spring is in accordance with a predefined stiffness.

7. The band-drive mechanism as recited in claim 1, wherein each of the first and second disks is machined to form at least one grave to serve as a track to confine the up-side band or the down-side band.

8. The band-drive mechanism as recited in claim 7, wherein a grave for the up-side band and a grave for the down-side band are not on the same plane from a perspective in geometry.

9. A band-drive mechanism in an opto-mechanical inspection system to move an optical component sensitive to particles, the band-drive mechanism comprising:

a first pulley including a first disk driven by a motor, wherein the first disk includes a spring loaded pushing force generating mechanism including:

a notch formed on the first disk;

a spring;

a spring holding block; and a shoulder screw, wherein the spring is compressed and held up by the spring holding block, the shoulder screw is used to hold the spring holding block and the spring in the notch of the first disk;

a second pulley including a second disk;

an up-side band and a down-side band, both made from a solid material that requires no lubricants when in operation, wherein both first and second disks are machined to form a first grove for the up-side band and a second grove for the down-side band to confine movements of the up-side and down-side bands, respective ends of the up-side band and the down-side band are secured on the first and second disks, and the second pulley is pulled to move an optical component by less than one full rotation with one of the up-side and down-side bands when the first pulley is driven by the motor.

10. The band-drive mechanism as recited in claim 9, wherein the material is metal.

11. The band-drive mechanism as recited in claim 10, wherein the metal is elgiloy steel or stainless steel.

12. The band-drive mechanism as recited in claim 9, wherein centers of the first disk and the first pulley are not coaxial.

13. The band-drive mechanism as recited in claim 12, wherein the first disk is an eccentric disk.

14. The band-drive mechanism as recited in claim 9, wherein a band tension on one of the up-side and down-side bands is optimized when stiffness of the spring is in accordance with a predefined stiffness.

* * * * *